United States Patent [19]

Dubois et al.

[11] 4,241,978
[45] Dec. 30, 1980

[54] COUPLING DEVICE FOR CONNECTING A LIGHT SOURCE TO AN OPTICAL FIBER

[75] Inventors: Jean-Claude Dubois; Gérard Mourgues, both of Caen, France

[73] Assignee: U.S. Philips Corporation, New York, N.Y.

[21] Appl. No.: 949,914

[22] Filed: Oct. 10, 1978

[30] Foreign Application Priority Data

Oct. 7, 1977 [FR] France .................. 77 30240

[51] Int. Cl.³ .................................. G02B 5/14
[52] U.S. Cl. .................................. 350/96.20
[58] Field of Search ...................... 350/96.20

[56] References Cited

U.S. PATENT DOCUMENTS

| 4,045,120 | 8/1977 | Corlieu et al. | 350/96.20 |
| 4,076,376 | 2/1978 | Slaughter | 350/96.20 |
| 4,080,044 | 3/1978 | Gousseau | 350/96.21 |
| 4,101,197 | 7/1978 | Kent | 350/96.20 |
| 4,118,100 | 10/1978 | Goell et al. | 350/96.20 |

FOREIGN PATENT DOCUMENTS

| 2555232 | 6/1977 | Fed. Rep. of Germany | 350/96.21 |
| 1304428 | 1/1973 | United Kingdom | 350/96.20 |

*Primary Examiner*—Stewart J. Levy
*Attorney, Agent, or Firm*—Marc D. Schechter

[57] ABSTRACT

A coupling device for coupling a light source, which emits light in accordance with Lambert's law, to a bundle of optical fibers by way of an optical rod. The largest dimension of the source at most equals half the diameter of the core of the coupling rod. The source and the coupling rod are secured in a flexible, elastic support which maintains a distance between a light-emissive surface of the source and the oppositely situated end of the coupling rod. This distance at most equals one third of the diameter of the core of the coupling rod.

9 Claims, 3 Drawing Figures

COUPLING DEVICE FOR CONNECTING A LIGHT SOURCE TO AN OPTICAL FIBER

BACKGROUND OF THE INVENTION

The invention relates to a coupling device for connecting a light source to optical fiber comprising a semiconductor light source, which emits light substantially in accordance with Lambert's law and which is mounted on a holder, and a coupling rod, which is formed by a part of an optical fiber having a circularly cylindrical core and cladding whose refractive index is smaller than the refractive index of the core, the coupling rod forming an optical connection between the light source and a bundle of optical fiber to be connected to the device.

In the field of telecommunications it is known to replace coaxial electrical connections, wire conductors between electronic apparatus with optical connections, optical fibers, between a light source and a light-sensitive receiver.

The optical fiber for use at high frequencies, in the range of gigahertz, offer the advantage that they are not susceptible to external parasitic interference such as cross-talk. Moreover, the attenuation coefficient of these optical fiber is smaller than that of conventional coaxial cables. Finally, optical are electrically insulating and they are also lighter than coaxial cables.

Generally, an optical fiber is formed by a first material in the form of a core which has a refractive index $N_1$ and which is covered by a second material in the form of cladding having a refractive index $N_2$. The refractive index $N_2$ is smaller than the refractive index $N_1$. The propagation of light inside the fiber core results from the difference between the refractive indices $N_1$ and $N_2$ of the core and the cladding, respectively.

For particular transmission applications, use may be made of only a single fiber. However, for reasons of reliability, several optical fibers are typically used for many signal transmission applications. These fibers are grouped in the form of a bundle of 7 or 19 fibres inside a jacket.

The use of a single fiber or of a bundle of several optical fibers, however, gives rise to some problems, notably in their connection to a light source.

It is known that the angle of radiation incidence of an optical fiber may not be larger than 10°. As a result, if the light source itself is of a substantially concentrated nature, for example, when the source is a laser, the connection of this source to the can be realized with high efficiency. However, if the light source is a semiconductor diode, which generates an emission of light at the semiconductor junction, the efficiency of the coupling to the fiber is substantially less.

In practice an electroluminescent diode is used as the light source in many cases. On the surface of a semiconductor crystal, light is generated which is emitted from the surface either directly or after having passed through the diode material. The electroluminescent diode in both cases acts as a spatial light source which emits light in accordance with Lambert's law, with the result that only a small amount of light emitted by the diode can be intercepted and conducted by the fiber. Therefore, in order to ensure optimum data transmission in a fiber or a bundle of fibers, it is desirable to radiate a maximum quantity of light into the fiber or the bundle of fibers. At the same time, alignment and the spacing of the light source with respect to the entrance face of the fiber or the bundle of fibers (this face is sometimes referred to as the "receive face") must be accurately performed and checked. Obviously, the more emission of the light source satisfies Lambert's law, the more important it is that these conditions are satisfied.

In order to increase the amount of transmitted light and to ensure correct transmission, it is known to use a bundle of 7 or 19 fibers, so that a receive face having a large cross-section is obtained. An optical for example a lens, is system added to the bundle in front of the receive face.

It is thus possible to intercept the radiation from the source at an angle which is larger than the maximum angle of radiation incidence of the fiber, and to refract the radiation from the source subsequently to an angle which at most equals maximum angle of incidence, with the result that the fiber (fibers) can receive and conduct the light.

In accordance with the described technique, the formation and the arrangement of the optical system must be realized with the utmost of care and with extreme precision. These requirements which give rise to a high cost for the optical device thus obtained.

A further coupler is disclosed in French Pat. No. 2,075,117. According to this patent, the electroluminescent diode and the receive face of the bundle of fibers are covered with a mass of transparent material having a refractive index which is larger than 1 in order to increase the quantity of light emerging from the diode.

This coupler has a number of drawbacks, notably regarding the alignment of the centers of the light source and the receive face of the optical fiber or the bundle of optical fibers.

The most recently proposed coupler consists of an intermediate element which is introduced between the light source and the bundle of fibres; this element is referred to as a "coupling rod" and is formed by a part of an optical fibers which, as is known, comprises a core and cladding of two materials of different refractive index.

This coupler, which can also be used between a bundle of fibers and a light-sensitive receiver, offers the advantage that the centering of the relevant elements with respect to each other is facilitated. When this is used in the most common case, i.e. for coupling a light source and a bundle of fibers, the cross-sectional area of the coupling rod must be larger than the cross-sectional area of the light source, but smaller than the overall cross-sectional area of the bundle of fiber.

The centering with respect to each other and the fixation of the light source and the coupling rod in the correct position is provided by a support which is constructed in known manner so that it exerts, via suitable mechanical means, a radial force on the coupling rod and/or on the light source.

Taking into account the most recent progress in mechanics, it has been found that, with respect to sources emitting radiation substantially in accordance with Lambert's law, the most important factors for obtaining efficient optical transmission are the cross-section of the light source and the distance between the source and the bundle of fibers or the distance between the source and the coupling rod.

SUMMARY OF THE INVENTION

The present invention concerns a coupling device which comprises a semiconductor light source, which spatially emits radiation substantially in accordance with Lambert's law and which is mounted on a holder, and a coupling rod, which is formed by a part of an optical fiber having a circularly-cylindrical core and cladding whose refractive index is smaller than that of the core. The coupling rod constitutes an optical connection between the light source and a bundle of fibers to be coupled to the device. In the device according to the present invention, the largest dimension of the source at the most equals half the diameter of the core of the coupling rod, and the source and the coupling rod are secured in a flexible, elastic support which maintains a distance, between the light-emissive surface of the source and the oppositely situated end of the coupling rod, which is at most equal to one third of the diameter of the core of the coupling rod.

Tests have demonstrated that the efficiency of the transmission of the quantity of light emitted by the source is optimum when these conditions are satisfied. This is because the dimensions and the distances chosen take into account the maximum angle of radiation incidence of the piece of optical fiber constituting the coupling rod.

For further improvement of the efficiency of transmission, a preferred embodiment of a coupling device according to the invention includes a transparent resin, in the space between the light-emissive surface of the light source and the coupling rod, whose refractive index equals that of the core of the fiber constituting the coupling rod. Thus, the source and the coupling rod accommodated in the flexible elastic support constitute a permanently pre-adjusted can then be connected to the end of a bundle of optical fibers.

Another preferred embodiment of a coupling device according to the invention includes a recess, in a first end of the flexible elastic support, in which at least the holder supporting the light source is secured. A second end of the support is provided with a duct in which the coupling rod is accommodated, the duct opening into the recess and extending from the first end to the second end.

When the dimensions of the recess and the duct are suitably chosen, the coupling rod and the light source can be very simply arranged and positioned with respect to each other in the interior of the support, so that the cost of the coupling device is substantially reduced.

The main components of the coupling element and the coupling rod are usually circularly-cylindrical. The bundles of fibers also have approximately the same shape. Therefore, the flexible elastic support preferably also has a circularly-cylindrical shape. Preferably, the recess and the duct for the coupling rod in the support are both circularly-cylindrical. The duct is also preferably subdivided into two portions of different width or diameter, the diameter of the duct portion situated near the second end being approximately equal to the diameter of the coupling rod, while the diameter of the remaining duct portion is larger than the diameter of the coupling rod but smaller than that of the recess.

Furthermore, deep grooves are preferably provided in the flexible, elastic support in the vicinity of the end situated opposite the light source. The grooves extend in directions transverse to the longitudinal axis of the coupling rod and in directions parallel to this longitudinal axis.

The grooves provided in the support serve to impart the necessary flexibility for clamping the coupling rod, clamping being realized by pressing the support on a shoulder, formed, for example, by flattening, in the interior of the coupling device. This is because the axial pressure exerted on the shoulder by the support when the support is secured in the coupling device is converted into a radial pressure which acts on the optical rod which is thus clamped and centered in the support. Small differences in the dimensions of the optical coupling rod and the duct in which the coupling rod is accommodated are thus permissible.

The presence of the grooves near the end of the flexible, elastic support offers another advantage. When the support end is clamped against the shoulder of the coupling device, the surface of that end is deformed. This deformation is utilized for adjusting the distance between the coupling rod and the bundle of optical fibers whose other end is connected to the coupling device.

Generally, the light source of the coupling device in according to the invention is formed by an electroluminescent diode comprising a III–V compound. Preferably, the material of the flexible, elastic support consists of a synthetic polymer, for example, a polyamide, tetrafluoroethylene, or an acetal.

The invention will be described in detail hereinafter with reference to the accompanying diagrammatic drawing.

BRIEF DESCRIPTION OF THE INVENTION

DESCRIPTION OF THE PREFERRED EMBODIMENTS

Figure 2:
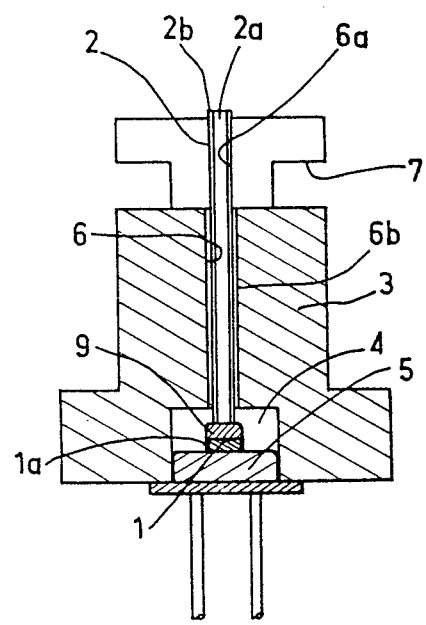
FIG. 2 is a sectional view taken along line II—II in FIG. 1.
Figure 1:
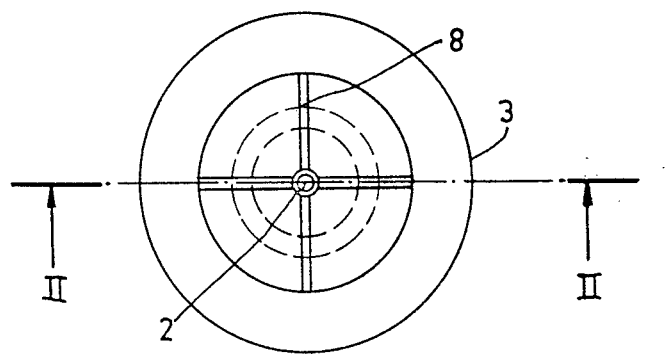
FIG. 1 is a plan view of a part of a coupling device according to the invention, comprising a light source and a coupling rod which are accommodated in a flexible elastic support.

FIGS. 1 and 2 show a part of the coupling device according to the invention which comprises a semiconductor crystal light source 1, 1a, a coupling rod 2, and a flexible elastic support 3 in which the light source 1 and the coupling rod 2 are secured.

In the embodiment shown, the light source 1 consists of a known electroluminescent diode which emits radiation in accordance with Lambert's law. The coupling rod 2 is formed by a piece of an optical fiber which consists of a core 2a and a cladding 2b.

Preferably, the support 3 is circularly-cylindrical. The support 3 is provided at a first end with a recess 4 having a shape which is identical to that of the holder 5 on which the source 1 is secured. The depth of the recess, however, exceeds the height of the holder 5. The support 3 also comprises a drilled cylindrical duct 6 in the support portion 6a which is situated in the vicinity of the second end. The diameter of the duct is approximately equal to the outer diameter of the coupling rod, while the diameter of the duct in the remaining portion 6b of the support 3 is slightly larger.

An annular groove 7 and radial slots 8 provided in the support 3 provide the flexibility and elasticity required for the centering and clamping of the coupling rod 2.

The optical connection between the source 1 and the end of the coupling rod which is situated opposite the source is realized by way of a drop of transparent resin 9, for example, a silicone resin.

Figure 3:
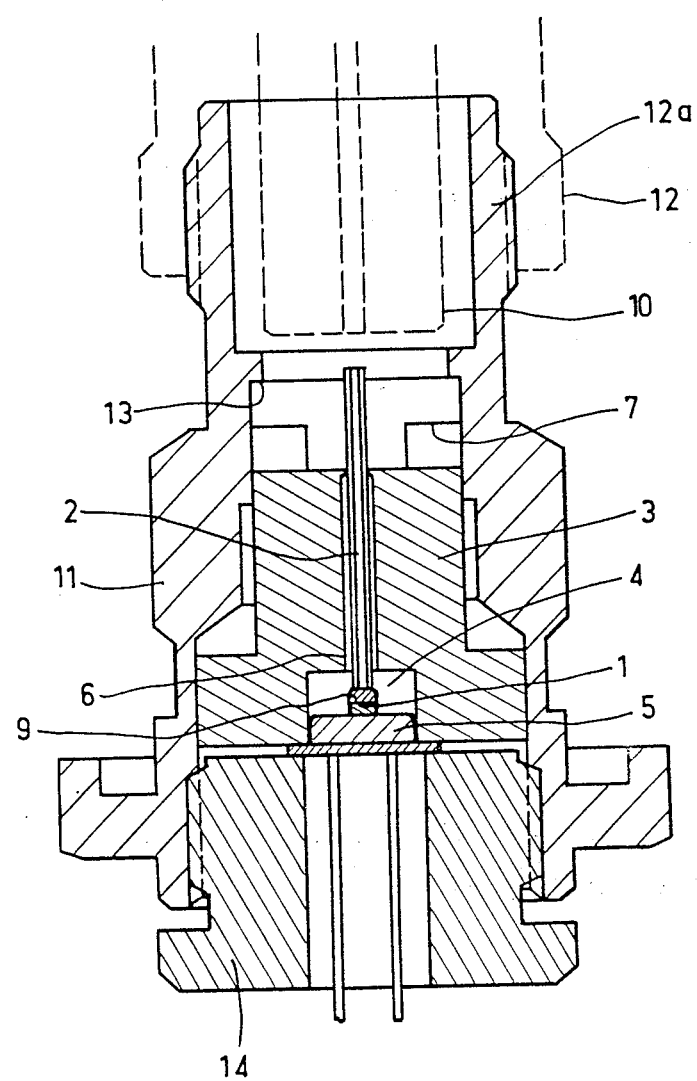
FIG. 3 is a sectional view of a coupling device according to the invention which is coupled to one end of a bundle of optical fibres.

FIG. 3 shows an optical coupling device according to the invention. The coupling device mainly comprises components which have already been described above with reference to FIGS. 1 and 2 which relate to the clamping of the coupling rod 2 in the support 3 and to the centering of the source 1 with respect to the coupling rod 2.

The coupling device shown in FIG. 3 is intended for connection to the end 10 of a bundle of optical fibers which forms an optical transmission line. The end of the transmission line comprises, for example, a complementary coupling element 12 (the end elements of the transmission line are denoted by a broken line in FIG. 3). To this end, a body 11 of the coupling device is connected to the end 10 of the transmission line via a threaded portion 12a.

The body 11 comprises a shoulder 13 for supporting the support 3 which is rigidly secured in the body 11 by way of a threaded bush 14.

When the bush 14 is clamped, the axial force exerted on the support 3 bearing on the shoulder 13 is partly converted into a radial force acting on the coupling rod 2 in the duct 6 of the support, the coupling rod 2 being located by this radial force.

Moreover, thanks to the flexibility achieved by way of the annular groove 7 and the slots 8, the position of the coupling rod 2 in the support 3 can be controlled by exerting such a force on the clamping bush 14 that the exit face of the coupling rod 2 will be situated at a desired distance from the end 10 of the transmission line.

Thanks to the flexibility and the elasticity of the support 3, the constituent parts of the coupling device can be manufactured with comparatively large tolerances.

The flexible elastic support 3 can be advantageously made using a polyamide, for example, the polyamide known as "nylon", or tetrafluoroethylene, or preferably a polyacetal, for example, the polyacetal known as "Delrin".

The body 11 of the coupling device is made of a suitable metal, for example, steel or a copper alloy.

What is claimed is:

1. A coupling device for connecting a light source to a bundle of optical fibers, the light source having a light-emitting surface which emits light substantially in accordance with Lambert's law and which is mounted on a holder, said coupling device comprising:
   a coupling rod which is formed by a part of an optical fiber having a circularly cylindrical core and cladding, the refractive index of the cladding being smaller than the refractive index of the core, said coupling rod forming an optical connection between the light source and the bundle of optical fibers to be connected to the device by having a first end facing the light source and having a second end facing the bundle of fibers; wherein
   the largest dimension of the source is at most equal to half the diameter of the core of the coupling rod; and
   the source and the coupling rod are secured in a flexible, elastic support which maintains a distance between the light-emissive surface of the source and the first end of the coupling rod which is at most equal to one third of the diameter of the core of the coupling rod.

2. A coupling device as claimed in claim 1, wherein the space between the light-emissive surface of the light source and the first end of the coupling rod is filled with a transparent resin whose refractive index equals that of the core of the fiber constituting the coupling rod 3. A coupling device as claimed in claim 1, wherein in a first end of said flexible, elastic support there is provided a recess in which at least the holder supporting the light source is secured, said support being provided near a second end with a duct in which said coupling rod is accommodated, the duct opening into the recess and extending from the first end to the second end.

4. A coupling device as claimed in claim 3, wherein the flexible elastic support is circularly-cylindrical.

5. A coupling device as claimed in claim 3, wherein the duct, formed in the support in which the coupling rod is to be accommodated, and the recess, in which the source is to be accommodated, are each circularly cylindrical.

6. A coupling device as claimed in claim 5, wherein in the vicinity of the second end of the support, which is situated opposite the light source, deep grooves are provided in the support, said grooves extending in a direction transverse to the longitudinal axis of the coupling rod and in directions parallel to said longitudinal axis.

7. A coupling device as claimed in claim 6, wherein that the flexible, elastic support is made of a synthetic polymer.

8. A coupling device as claimed in claim 7, wherein that the synthetic material of the support is a polyamide, tetrafluoroethylene or a polyacetal.

9. A coupling device for connecting a light source to a bundle of optical fibers, the light source having a light-emitting surface which emits light substantially in accordance with Lambert's law and which is mounted on a holder, said coupling device comprising:
   a coupling rod which is formed by a part of an optical fiber having a circularly cylindrical core and cladding, the refractive index of the cladding being smaller than the refractive index of the core, said coupling rod forming an optical connection between the light source and the bundle of optical fibers to be connected to the device by having a first end facing the light source and having a second end facing the bundle of fibers; wherein
   the largest dimension of the source is at most equal to half the diameter of the core of the coupling rod;
   the source and the coupling rod are secured in a flexible, elastic support which maintains a distance between the light-emissive surface of the source and the first end of the coupling rod which is at most equal to one third of the diameter of the core of the coupling rod;
   the flexible, elastic support having a first end and a second end, the first end being provided with a recess in which at least the holder supporting the light source is secured, the second end being provided with a duct in which said coupling rod is accommodated, the duct opening into the recess and extending from the first end to the second end; and
   the duct formed in the flexible elastic support is subdivided into two portions of different width, the width of the duct portion situated near the second end being approximately equal to the diameter of the coupling rod, while the width of the remaining duct portion is larger than the diameter of the coupling rod but smaller than the width of the recess in which the holder with the light source is accommodated.

* * * * *

UNITED STATES PATENT OFFICE
CERTIFICATE OF CORRECTION

Patent No. 4,241,978　　　　　　　　　　　Dated　December 30, 1980

Inventor(s)　　JEAN-CLAUDE DUBOIS et al

It is certified that error appears in the above-identified patent and that said Letters Patent are hereby corrected as shown below:

Col. 6, line 26, Before "the" delete "that"

Col. 6, line 28, Before "the" delete "that"

Signed and Sealed this

*Twenty-first* Day of *April 1981*

[SEAL]

*Attest:*

RENE D. TEGTMEYER

*Attesting Officer*　　　*Acting Commissioner of Patents and Trademarks*